(12) United States Patent
Shepherd et al.

(10) Patent No.: US 11,367,245 B2
(45) Date of Patent: Jun. 21, 2022

(54) TRANSFORMING OBJECT DATA MODELS TO DISPERSE OBJECT PROPERTIES

(71) Applicant: HEWLETT-PACKARD DEVELOPMENT COMPANY, L.P., Houston, TX (US)

(72) Inventors: Matthew A Shepherd, Vancouver, WA (US); Jake Wright, San Diego, CA (US); Hector Jose Lebron, San Diego, CA (US); Vanessa Verzwyvelt, Vancouver, WA (US); Morgan T Schramm, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 802 days.

(21) Appl. No.: 16/077,774

(22) PCT Filed: Jul. 10, 2017

(86) PCT No.: PCT/US2017/041295
§ 371 (c)(1),
(2) Date: Aug. 14, 2018

(87) PCT Pub. No.: WO2019/013737
PCT Pub. Date: Jan. 17, 2019

(65) Prior Publication Data
US 2021/0201562 A1 Jul. 1, 2021

(51) Int. Cl.
*G06T 15/00* (2011.01)
*G06T 15/08* (2011.01)
*B33Y 50/02* (2015.01)

(52) U.S. Cl.
CPC .............. *G06T 15/08* (2013.01); *B33Y 50/02* (2014.12)

(58) Field of Classification Search
CPC ................................ G06T 17/30; B33Y 50/00
(Continued)

(56) References Cited

U.S. PATENT DOCUMENTS

| 6,556,199 | B1 | 4/2003 | Fang et al. | |
|---|---|---|---|---|
| 7,672,790 | B2 * | 3/2010 | McGraw | G01R 33/56341 702/19 |

(Continued)

FOREIGN PATENT DOCUMENTS

| EP | 1229463 A2 | 8/2002 |
|---|---|---|
| WO | WO-2016119879 A1 | 8/2016 |
| WO | 2016169614 A1 | 10/2016 |

OTHER PUBLICATIONS

Tedia S, Williams CB. Manufacturability analysis tool for additive manufacturing using voxel-based geometric modeling. In27th annual international solid freeform fabrication (SFF) symposium Aug. 8, 2016 (pp. 3-22).*

(Continued)

*Primary Examiner* — Phu K Nguyen
(74) *Attorney, Agent, or Firm* — HP Inc. Patent Department

(57) ABSTRACT

In an example a method includes identifying, by a processor, in a data model of at least a portion of a three-dimensional object, an object property associated with a location in the three-dimensional object. A data model of a virtual build volume comprising at least a portion of the three-dimensional object may be generated in which an association with an object property is dispersed beyond the location.

20 Claims, 4 Drawing Sheets

(58) Field of Classification Search
USPC .......................................................... 345/418
See application file for complete search history.

(56) References Cited

U.S. PATENT DOCUMENTS

| | | | |
|---|---|---|---|
| 8,470,231 B1 * | 6/2013 | Dikovsky | B29C 33/448 |
| | | | 264/308 |
| 8,471,849 B1 | 6/2013 | Hickman et al. | |
| 10,144,178 B2 * | 12/2018 | Meisner | B29C 64/118 |
| 10,357,919 B2 * | 7/2019 | Tringali | B29C 37/0067 |
| 10,428,463 B2 * | 10/2019 | Wang | A47L 13/16 |
| 10,744,717 B2 * | 8/2020 | Gottschalk-Gaudig | |
| | | | B33Y 10/00 |
| 10,781,315 B2 * | 9/2020 | Saha | C08F 222/18 |
| 10,857,730 B1 * | 12/2020 | Cohen | B29C 70/382 |
| 10,974,458 B2 * | 4/2021 | Sanroma Garrit | G06F 30/00 |
| 11,003,166 B2 * | 5/2021 | Carruesco Llorens | |
| | | | B33Y 50/00 |
| 2013/0124151 A1 | 5/2013 | Mech et al. | |
| 2015/0105889 A1 | 4/2015 | Tsai | |
| 2015/0197063 A1 | 7/2015 | Shinar et al. | |
| 2015/0269289 A1 | 9/2015 | Kim et al. | |
| 2017/0057169 A1 | 3/2017 | Grbic et al. | |
| 2018/0250874 A1 * | 9/2018 | Tringaly | B29C 64/277 |
| 2019/0134915 A1 * | 5/2019 | Schmidt | G06F 30/17 |
| 2021/0299950 A1 * | 9/2021 | Wolter | B29C 64/245 |

OTHER PUBLICATIONS

Bader C, Kolb D, Weaver JC, Sharma S, Hosny A, Costa J, Oxman N. Making data matter: Voxel printing for the digital fabrication of data across scales and domains. Science advances. May 1, 2018;4(5):eaas8652.*

"Cura 3D Tutorial—Introduction to Cura 3D", Retrieved from Internet: https://all3dp.com/cura-tutorial-3d-printing/, Jan. 12, 2017, 17 pages.

* cited by examiner

TRANSFORMING OBJECT DATA MODELS TO DISPERSE OBJECT PROPERTIES

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and Irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Figure 1:
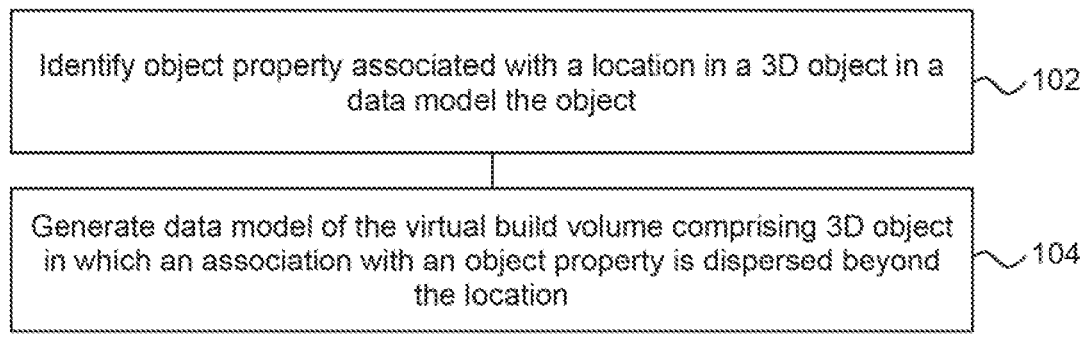
FIG. 1 is an example of a method for dispersing object properties in an object data model.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

Another example of a print agent is a coalescence modifying agent (referred to as a modifying or detailing agent), which acts to modify the effects of a fusing agent and/or energy for example by inhibiting or reducing (e.g. by cooling), increasing coalescence and/or to assist in producing a particular finish or appearance to an object. A property modification agent, for example comprising a dye, colorant, a conductive agent, an agent to provide transparency or elasticity or the like, may in some examples be used as a fusing agent or a modifying agent (which use may depend on a type of print agent with which it is combined), and/or as a print agent to provide a particular property for the object Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

In some examples, the slice of the object model may be one 'voxel' thick. In some examples of additive manufacturing, three-dimensional space may be characterised in terms of such voxels, i.e. three-dimensional pixels, wherein each voxel occupies or represents a discrete volume. In some examples, the voxels are determined bearing in mind the print resolution of a print apparatus, such that each voxel represents a volume which may be uniquely addressed when applying print agents, and therefore the properties of one voxel may vary from those of neighbouring voxels. In other words, a voxel may correspond to a volume which can be individually addressed by a print apparatus (which may be a particular print apparatus, or a class of print apparatus, or the like) such that the properties thereof can be determined at least substantially independently of the properties of other voxels. For example, the 'height' of a voxel may correspond to the height of a layer of build material. In some examples, the resolution of a print apparatus may exceed the resolution of a voxel, i.e. a voxel may comprise more than one print apparatus addressable location. In general, the voxels of an object model may each have the same shape (for example, cuboid or tetrahedral), but they may in principle differ in shape and/or size. In some examples, voxels are cuboids based on the height of a layer of build material (which may for example be around 80 µm in some examples). For example, the surface area may be around 42 µm². In some examples, in processing data representing an object, each voxel may be associated with properties, and/or with print instructions, which apply to the voxel as a whole.

FIG. 1 shows an example of a method which may be a computer implemented method, for example carried out using at least one processor, and may comprise a method of dispersing an object property defined for a location (which may comprise a point, line, 2D region or 3D region) in an object to be generated in additive manufacturing to apply to, or influence, a larger portion of the object, or a larger portion of the build volume comprising the object. In other words, properties may be 'grown' or 'diffused' within at least a portion of an object, and/or around an object.

Block 102 comprises identifying, by a processor, in a data model of a three-dimensional object, an object property associated with a location in the object. The data model may comprise a data model of at least part of an object to be generated in additive manufacturing. The data may, for example, be held in or received from a memory, received over a network, received over a communications link or the like. In some examples, the data model may, for example, comprise object model data and object property data. The object model data may define a three-dimensional geometric model of at least a portion of the object model, including the shape and extent of all or part of an object in a three-dimensional co-ordinate system, e.g. the solid portions of the object. In some examples, the data model may represent the surfaces of the object, for example as a mesh of 2D polygons, or the object as whole as a mesh of 3D polygons. In some examples, the object may be described using a vector model. The object model data may for example be generated by a computer aided design (CAD) application.

Object properties may be specified for example to define at least one object property for the three-dimensional object to be generated. In one example, the object property data may comprise any or any combination of appearance, functional and/or mechanical properties, for example any, or any combination of color, flexibility, elasticity, rigidity, surface roughness, porosity, inter-layer strength, density, conductivity or other electrical properties and the like for at least a portion of the object to be generated. In some examples, the object properties may describe geometrical aspects, for example the orientation of a surface (which may, as a result of the way additive manufacturing is performed, impact a property such as the appearance of the surface and/or the processing performed in order to result in an intended appearance or other properties). The locations may be surface locations, a location internal to the object, and may be points, lines, 2D regions or 3D regions.

Block 104 comprises generating, by the processor, a data model of a virtual build volume comprising at least part three-dimensional object in which an association with an object property is dispersed beyond the location, for example to occupy a region.

The virtual build volume may for example comprise a boundary box enclosing the object, may be the size and shape of the object (i.e. follow the surfaces of the object), and/or represent at least part of a build volume in which the object is to be fabricated. In some examples, the virtual build volume may comprise one or more 'slices', each of which may represent a layer of the object to be fabricated in layer-by-layer additive manufacturing of the object.

The region in to which the property is dispersed may comprise a region of the object which extends beyond the location, and/or a region outside physical object to be generated. The region may be characterised by a distance from the location, i.e. the association with the property may be dispersed or 'grown' to occupy a region having a boundary defined by the locus of points at a fixed distance from the location (which may be a point, a line, a 2D shape, a 3D shape (for example a voxel)). In some examples, more than one object property may be dispersed or grown into a particular region, in which case an average, merged (e.g. using a Gaussian blur) or interpolated property may be determined, or a property may be selected according to a hierarchy, or the like.

In object model data, properties (e.g. color, conductivity, etc.) may be represented in a form which is infinitesimal (zero or near-zero) in thickness (e.g. associated with a 2D surface as noted above). In other examples, the location associated with a property may be insufficient to provide the property in practice (for example, too thin to provide a color, a conductive track, a resilient layer or the like). In order to print the object, an object property may be diffused so as to provide a 'thickness' to the association between the object model and the property by diffusing or 'growing' the property into a region beyond the location.

In some examples, it may be intended to apply at least one object property to a region outside the physical object to be generated, for example into a region for which no properties are defined. For example, it may be intended to color some build material which is not intended to fuse as, in practice, some fusion may take place beyond the intended bounds of the object and/or unfused particles may adhere to a surface. Coloring such particles/material may mitigate any negative effect this may have on the appearance of the object. Other properties may also extended outside the object.

In some examples, dispersing the association to a region may be achieved by assigning properties to at least one voxel based on the distance of that voxel to a location (e.g. a point, a line, a polygon of a polygon mesh describing the object, a polytope describing the object, a voxel with which a property has been associated, etc.) in which a property is defined. This may for example comprise assigning the property of the closest location, or a combination of all properties within a range, or the like. For example, a property may be assigned to all voxels which coincide with an object definition and then a distance from a given voxel to such voxel(s) may be determined. In another example, an interior voxel may be assigned a property based on its distance from the surface (rather than a distance from a surface voxel).

As is further set out below, in some examples, a property may not be diffused in isolation—some blending or interpolation of one or more properties may be performed.

As noted above, in some examples, the orientation of an object surface (usually specified in terms of a face normal) may be taken into account in defining a property, or may be utilized when determining print control instructions for generating a portion of an object (or region of build material outside the object) having the property. Therefore, the orientation of a location may also be diffused in a similar manner.

In some examples, the object property is diffused to occupy a region up to a threshold distance from the location. This may for example comprise a radius, or a locus from the location. In some examples, the region is a region of the object (and in some examples the diffusion of the property outside the object may be associated with a different distance, or there may be no diffusion outside the object). For example, this may comprise a minimum distance to provide a particular property (and may depend on the property under consideration). For example, in order to provide a color of a particular vibrancy, it may be that an outer shell of the object having a predetermined thickness should be attributed with the color (as sub-surface material may be visible, or impact the appearance of, the object surface). In another example, a conductive track may be diffused to have a thickness corresponding to a predetermined or threshold conductivity, or a resilient layer may have at least a predetermined thickness or the like. In some examples, the distance may comprise a tolerance (which may for example be used to resolve conflicts between different possible properties which may apply, as is further described below).

Figure 2:
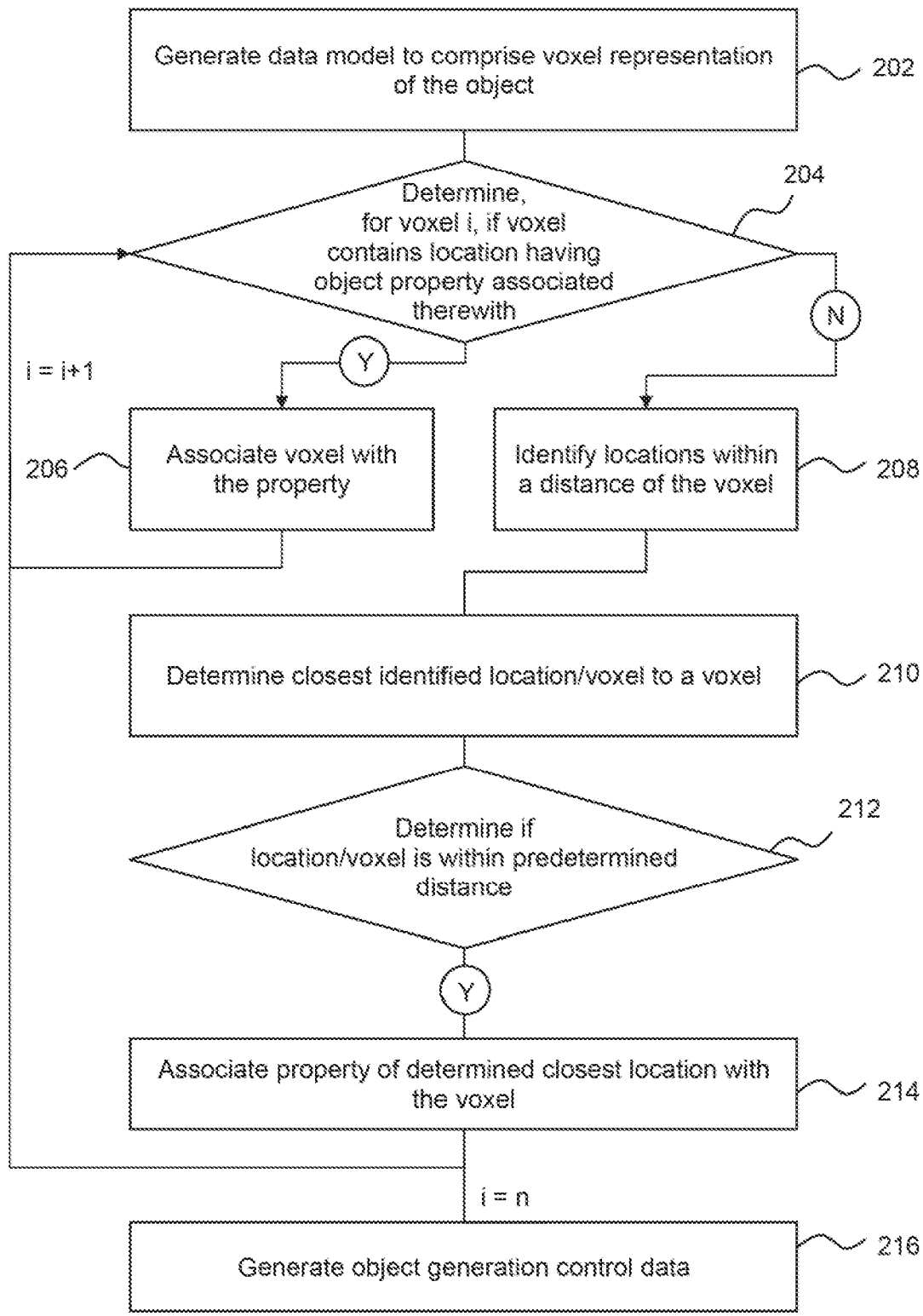
FIG. 2 is an example of a method of generating object generation control data.

FIG. 2 is an example of a method of generating an object in which blocks 202 to 214 are an example of a method of carrying out the method of block 104 of FIG. 1. In this example, a 'voxel' representation of an object may be generated and object properties in the data model of the virtual build volume are specified at the voxel level. For example, a voxel at a given location may have at least one specified property: for example, it may have a particular color, transparency, conductivity and/or strength or the like. Properties need not be specified for all voxels, and in some examples at least some voxels may be associated (for example in the absence of a specification of a property) with a default property. However, in other examples, models other than voxel models may be used.

Block 202 comprises generating the data model of the virtual build volume to comprise a voxel representation of the object/virtual build volume. For example, this may comprise dividing the volume occupied by the object into voxels. This may for example comprise defining voxels which transect the surfaces defined in the data model, i.e. as an object is rendered as voxelized 'blocks', the surface blocks thereof may be partially contained within and partially lie outside the previously defined model. In other examples, properties may be associated with locations other than surfaces.

Block 204 comprises determining, for each voxel of n voxels in turn, if that voxel comprises or contains a location having an object property associated therewith. For example, this may be the case if a surface or line transects the voxel, and there is property defined in association with that surface/line, the voxel may have the surface/line properties associated therewith. In another example, a voxel may overlie (i.e. contain) a point location having defined properties. In another example, a voxel may be lie within a 3D region having defined properties. If so, the voxel is associated with the property in block 206.

Any voxel which contains all or part of a location for which a property is defined may be associated with the property. This effectively expands the properties to be at least 'one voxel thick' in the object.

If a voxel does not contain a location having an associated property (i.e. the determination in block 204 is negative), the method further comprises identifying the locations within a distance of the voxel in block 208. As these locations have been associated with voxels in block 206, this block may comprise determining the distance to a voxel.

In some examples, a diffusion distance may be set according to properties of a material and, where voxels are used, the voxel distance may depend on the voxel size. For example, an appearance property diffusion may occur up to around 300 μm in a relatively opaque material, or up to around 1000-2000 μm for more translucent materials. Where voxel is of the order of 42 μm in an xy plane relating to a layer of additive manufacturing (which corresponds to a print resolution of around 600 dpi) and 80 μm in z, and appearance property diffusion to a region having a boundary up to 300 μm from the voxel may be defined, which may mean diffusion occurs over a range of around up to 15 voxels (and in some examples, around 5-10 voxels). However, 21 μm voxels (i.e., 600 to 1200 dpi), may be defined in some examples, so the same 300 μm may relate to a voxel count of up to 30 voxels. In other words, a number of voxels depends on the specifiable resolution of the technology and the intended diffusion depth, n_voxels=diffusion_depth/voxel_dimension.

In some examples, the n voxels may be within a 'voxel count' of the voxel having a defined property. However, as voxels may be anisotropic (i.e., x, y and/or z dimensions of the voxel are not equal), e.g. rectangular, and/or the distance is on a diagonal (2d or 3d), this may result in diffusion which is greater in one direction than another. In some examples, the distance may be computed using a Euclidian norm (i.e., distance=$\sqrt{(dx^2+dy^2+dz^2)}$), which may be a floating point number, i.e., a Euclidian distance. This floating point number could be in any unit (and in some examples may comprise a dimension of a voxel). In another example, the distance may be a "Manhattan distance", i.e. a sum of x, y and z voxelwise steps.

In block 210, the method comprises determining the closest identified location (or voxel having a property associated therewith) to a voxel and determining in block 212 if the location or voxel is within a predetermined distance and, if so, block 214 comprises associating the property of the determined closest location with the voxel.

Such a method may be relatively quick in operation and may consume relatively small amounts of computing resource. It allows a voxel to "inherit" the property from the closest voxel with properties, if that voxel is within a predetermined distance (which may be determined based on how large a region it is intended to diffuse a property into). In some examples, the property may be interpolated, for example having a value which decreases with distance from the location.

Once all n voxels of the object have been processed, block 216 comprises generating object generation control data from the data model of the virtual build volume. In some examples, this may utilise a mapping resource such as a look-up table or mapping algorithm to identity print agent amounts and/or combinations to apply to an object region corresponding. For example, this may specify which print agent should be placed, and in what quantity, so as to provide a voxel having the properties associated therewith. In some examples, the actual placement of print agent may be determined using halftoning techniques or the like.

The voxel associations may be determined for an object as a whole or may be determined for a 'slice' of the object which may correspond to a layer of the object to be generated in a layer-by-layer additive manufacturing process.

In some examples, the method may further comprise generating an object using additive manufacturing based on the control instructions. For example, this may comprise forming successive layers of build material on a print bed and applying print agents according to the control instructions for that layer and exposing the layer to radiation, resulting in heating and fusion of the build material.

Figure 3:
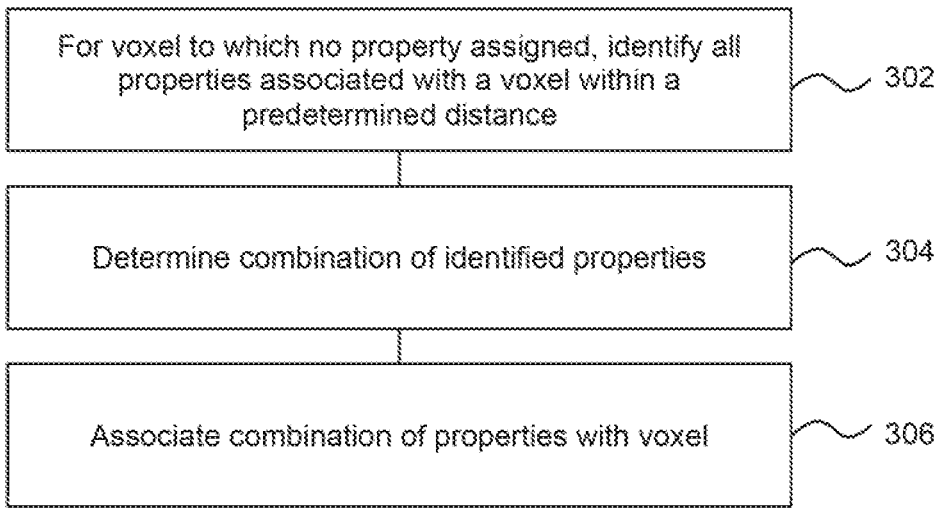
FIG. 3 is an example of a method of associating object properties with voxels.

FIG. 3 shows an alternative to the method of blocks 210 to 214.

The method of FIG. 3 comprises, in block 302, for a first voxel to which a property has not been assigned in block 206, identifying a plurality of properties each associated with a voxel within a predetermined distance. Block 304 comprises determining a combination of the identified properties. In some examples, this may comprise interpolating a property which is intermediate to two or more property values, in some examples based on the number of and distance to voxels having that property. In some examples, the property may be a weighted average, for example a weighting by distance squared, or by applying a median filter or the like. Block 306 comprises associating the combination of properties with the first voxel.

In this way, a voxel may "inherit" a combination of the properties from the closest voxels with properties by combination, if those voxels is within the predetermined distance.

To consider an example: for a voxel, voxelA, there may be two voxels with properties defined within a radius of 10 arbitrary distance units:

Voxel1 is at a distance of 8.2 and voxel2 is at a distance of 8.1.

In one example, an average (which may be a weighted average) of the property values for voxel1 and voxel2 could be determined an associated with voxelA could be taken. This allows a gradual transition of properties. However, in another example, the property value of a particular (e.g. the determined closest identified location having a property) voxel of voxel1 and voxel2 may be adopted for voxelA. This may result in a simplification of the generation and application of object generation control instructions in that, the instructions for generating voxelA in this case would be the same as for Voxel1. A max or a median filter may be used.

In some examples, the closest voxel may be selected but combined with other the properties of other voxels within a tolerance thereof. For example, if the closest voxel is at a distance of 8.2, the value for this voxel may be combined with the property value(s) for voxels within a predetermined distance of this voxel, for example:

Property_final=weighting_function
(set_of_voxels_within_tolerance).

Figure 4:
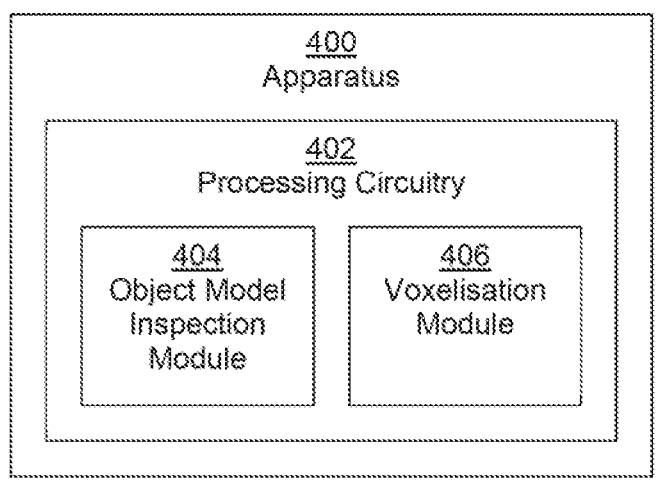
FIGS. 4 and 5 are examples of apparatus for processing data relating to additive manufacturing.

FIG. 4 is an example of an apparatus 400 comprising processing circuitry 402. In this example the processing circuitry 402 comprises an object model inspection module 404 and a voxelisation module 406.

In use of the apparatus 400, the object model inspection module 404 is to identify an object property associated with a location in the object and the voxelisation module 406 is to generate a representation of a build volume comprising at least a portion of the object as a plurality of discrete voxels. More particularly, the voxelisation module 406 is to selectively associate the object property identified by the object model inspection module 404 with a voxel based on the relative positions of the voxel and the location, for example as described above.

In some examples, the location is a surface location and the voxelisation module 406 is to selectively assign the property to voxels within a predetermined distance of the surface (or within a predetermined distance of a surface voxel to which a property has been associated). In some examples, the diffusion may be bounded by the object boundaries (i.e., carried out inside or outside the object) and/or different distances may be applied inside and outside the object. In other examples, the location may be an interior location of an object. The representation of a build volume comprising the object may comprise just the object, or may comprise a region around the object, for example representing a fabrication chamber, or a boundary box enclosing the object or a slice thereof, or the like.

In some examples, the object model inspection module 404 is to identify a plurality of object properties each associated with different locations/voxels in the object, and the voxelisation module 406 is to selectively associate the property of the closest one of the locations/voxel with a voxel when the voxel is within a predetermined distance of that location. In other examples, the object properties may be combined, for example using an average, as described above.

Figure 5:
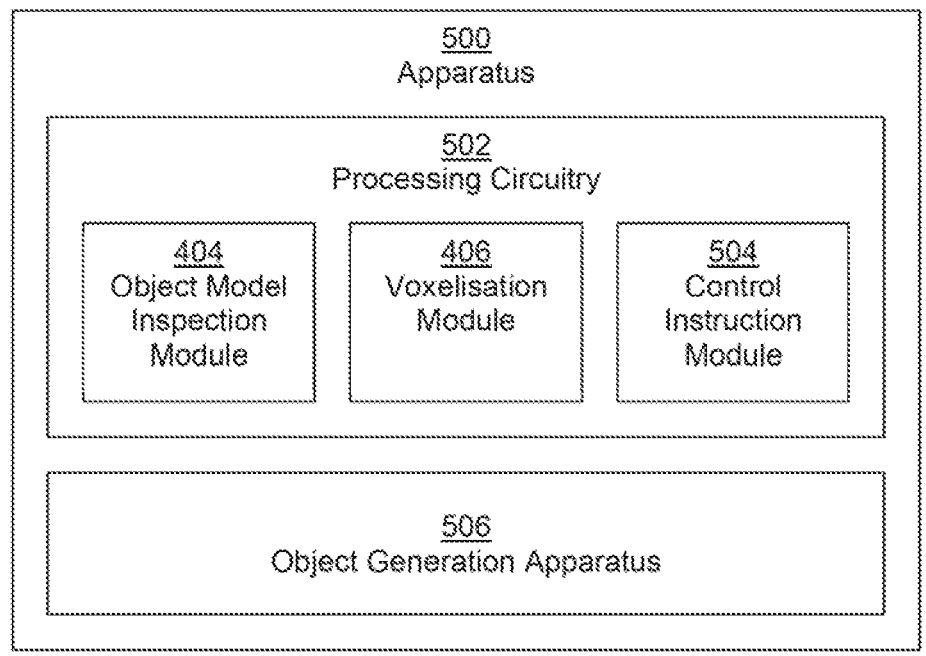

FIG. 5 shows an example of an apparatus 500 comprising processing circuitry 502 which comprises the object model inspection module 404 and the voxelisation module 406 as well as a control instruction module 504. The apparatus 500 further comprises an object generation apparatus 506.

In use of the apparatus 500, the control instruction module 504 generates control instructions for generating an object based on the representation of the object as a plurality of discrete voxels. For example, each property or combination thereof may map, via a look-up table or some other mapping resource to a print agent or print agent combination to apply to a physical volume corresponding to the voxel. In some examples, a halftoning process may be used to determine where print agent drop(s) may be applied. In some examples, more than one print agent and/or more than one drop of a print agent may be applied to a physical volume corresponding to a voxel.

The object generation apparatus 506 is to generate the object according to the control instructions, and may to that end comprise additional components such as a print bed, build material applicator(s), print agent applicator(s), heat source(s) and the like, not described in detail herein.

The processing circuitry 402, 502 may be arranged to carry out at least parts of the methods of FIGS. 1 to 3.

Figure 6:
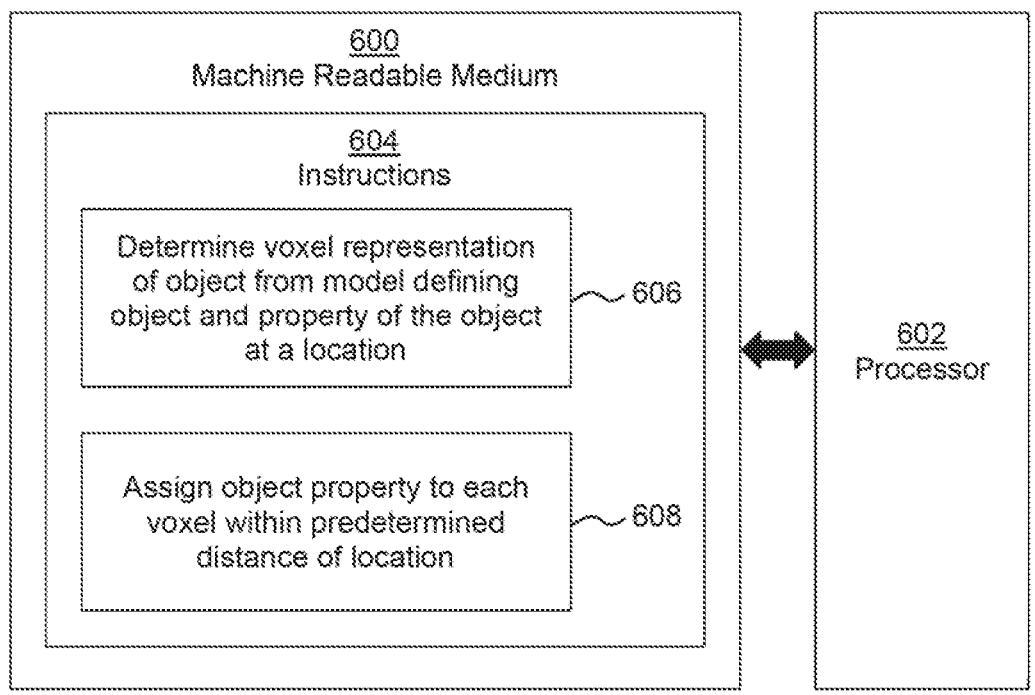
FIG. 6 is an example of a machine readable medium in association with a processor.

FIG. 6 is an example of a tangible (non-volatile) machine readable medium 600 in association with a processor 602. The machine readable medium 600 stores instructions 604 which, when executed by the processor 602, cause the processor 602 to carry out processes. The instructions 604 comprise instructions 606 to cause the processor 602 to determine a voxel representation of a build volume comprising at least of portion of an object from a model defining at least a portion of the object and at least one property of the object at the surface and instructions 608 to cause the processor 602 to assign at least one object property to each of a plurality of sub-surface voxels within a predetermined distance of the object surface.

In some examples, the instructions 604 may comprise instructions to cause the processor 602 to determine a voxel representation of an object from a model defining a surface of the object and at least one property of the object at the surface, and to assign at least one object property to each of a plurality of sub-surface voxels within a predetermined distance of the object surface. In other examples, at least one property of the object may be assigned to a voxel which is external to the object.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the object model inspection module 404, the voxelisation module 406 and the control instruction module 504) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
identifying, by a processor, in a data model of at least a portion of a three-dimensional object, an object property associated with a location in the three-dimensional object, wherein the object property is represented without thickness; and
generating, by the processor, a data model of a virtual build volume comprising at least a portion of the three-dimensional object in which an association with the object property is dispersed beyond the location, wherein the association comprises a thickness for the object property.

2. The method according to claim 1 in which generating the data model of the virtual build volume comprises generating a voxel representation of the object and associating the object property with at least one voxel.

3. The method according to claim 2 further comprising determining whether a voxel contains with the location, and, if so, associating the voxel with the object property.

4. The method according to claim 2 further comprising:
identifying a plurality of object properties each associated with a different location; determining the closest identified location to a voxel; and
associating the object property of the determined closest identified location with the voxel.

5. The method according to claim 2 further comprising:
for a first voxel to which a property has not been assigned, identifying a plurality of object properties each associated with a voxel within a predetermined distance;
determining a combination of the identified object properties; and
associating the combination of identified object properties with the first voxel.

6. The method according to claim 1 in which the object property is dispersed beyond the location to a threshold distance from the location.

7. The method according to claim 1 in which the object property is dispersed beyond the location to a threshold distance from the location, wherein the distance comprises a tolerance.

8. The method according to claim 1 further comprising generating object generation control data from the data model of the virtual build volume.

9. The method according to claim 1, wherein the object property represented without thickness comprises an object property with zero thickness.

10. The method according to claim 1, wherein the object property represented without thickness comprises a color for the location.

11. The method according to claim 1, wherein the object property represented without thickness comprises an electrical property for the location.

12. The method according to claim 1, wherein the object property represented without thickness comprises an object property associated with a two-dimensional surface.

13. The method according to claim 1, wherein generating the data model of the virtual build volume comprises extending the virtual build volume by the thickness beyond the location.

14. An apparatus comprising processing circuitry, the processing circuitry comprising:
an object model inspection module to identify an object color property without thickness associated with a location in an object represented in an object model; and
a voxelisation module to generate a representation of a build volume comprising at least a portion of the object as a plurality of discrete voxels, wherein the voxelisation module is to selectively associate the object color property without thickness with a voxel of a given thickness based on a relative position of the voxel and the location.

15. The apparatus according to claim 14 in which the object model comprises a representation of a surface of the object, the location is a surface location and the voxelisation module is to selectively assign the object color property to voxels within a predetermined distance of the surface.

16. The apparatus according to claim 14 in which the object model inspection module is to identify a plurality of object properties each associated with a different location in the object, and the voxelisation module is to selectively associate the property of the closest one of the locations with a voxel when the voxel is within a predetermined distance of that location.

17. The apparatus according to claim 14 further comprising a control instruction module to determine object generation control data based on the representation of the object as a plurality of discrete voxels.

18. The apparatus according to claim 17 further comprising an object generation apparatus to generate an object using the object generation control data.

19. A non-transitory machine readable medium comprising instructions which, when executed by a processor, cause the processor to:
determine a voxel representation of a build volume comprising at least a portion of an object from a model defining at least a portion of the object and a conductivity property represented without thickness in the model of the object at a location, and assign the conductivity property to each of a plurality of voxels within a predetermined distance of the location based on the conductivity property represented without thickness.

20. The non-transitory machine readable medium according to claim 19 further comprising instructions which, when executed by a processor, cause the processor to:

determine a voxel representation of an object from a model defining a surface of the object and the conductivity property of the object at the surface, assign the conductivity property to each of a plurality of sub-surface voxels within a predetermined distance of the surface of the object.

* * * * *